(12) United States Patent
Gordon

(10) Patent No.: US 12,195,119 B2
(45) Date of Patent: Jan. 14, 2025

(54) MODULAR FRONT DRIVETRAIN ASSEMBLY

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 0 days.

(21) Appl. No.: 17/669,287

(22) Filed: Feb. 10, 2022

(65) Prior Publication Data

US 2022/0234663 A1  Jul. 28, 2022

Related U.S. Application Data

(63) Continuation-in-part of application No. 17/019,829, filed on Sep. 14, 2020, now Pat. No. 11,958,535.

(Continued)

(51) Int. Cl.
*B62D 63/02* (2006.01)
*B60G 7/00* (2006.01)
(Continued)

(52) U.S. Cl.
CPC .......... *B62D 63/025* (2013.01); *B60G 7/001* (2013.01); *B60G 7/008* (2013.01); *B60G 9/00* (2013.01);
(Continued)

(58) Field of Classification Search
CPC ...... B62D 63/025; B62D 21/12; B62D 25/08; B60G 7/001; B60G 7/008; B60G 9/00; B60G 2204/143; B60G 2300/07; B60G 2400/82; B60G 2500/30; B60K 17/16; B60K 17/22

See application file for complete search history.

(56) References Cited

U.S. PATENT DOCUMENTS

| | | | |
|---|---|---|---|
| 4,057,120 A * | 11/1977 | Roethlisberger | B60G 7/02 180/263 |
| 7,281,600 B2 * | 10/2007 | Chernoff | B62D 21/07 180/58 |

(Continued)

FOREIGN PATENT DOCUMENTS

| WO | WO-2011119764 A1 * | 9/2011 | ............... B60G 7/02 |
| WO | WO-2017196776 A1 * | 11/2017 | ............. B60G 11/27 |
| WO | WO-2018096513 A1 * | 5/2018 | ............... B60G 3/18 |

*Primary Examiner* — Jason D Shanske
*Assistant Examiner* — Matthew James O'Neill
(74) *Attorney, Agent, or Firm* — Barry Choobin; Patent 360

(57) ABSTRACT

An apparatus and methods are provided for a modular front drivetrain comprising a single assembly that may be installed onto and removed from a vehicle. The modular front drivetrain comprises a modular chassis supporting a transaxle, a front differential, and a steering gear for operating front wheels of the vehicle. The transaxle, the front differential and drive axles convey torque from an engine onboard the vehicle to the front wheels. A spindle assembly is coupled with each front wheel of the vehicle and pivotally joined with the modular chassis by way of a front suspension system. Steering rods coupled with the spindle assemblies horizontally rotate the front wheels according to operation of a steering wheel onboard the vehicle. The modular front drivetrain advantageously facilitates replacing an entire drivetrain and suspension assembly quickly and easily in the event of a part failure during racing applications.

20 Claims, 9 Drawing Sheets

Related U.S. Application Data

(60) Provisional application No. 63/164,079, filed on Mar. 22, 2021, provisional application No. 62/900,481, filed on Sep. 14, 2019.

(51) Int. Cl.
  *B60G 9/00*    (2006.01)
  *B60K 17/16*   (2006.01)
  *B60K 17/22*   (2006.01)
  *B62D 3/02*    (2006.01)
  *B62D 21/12*   (2006.01)
  *B62D 25/08*   (2006.01)

(52) U.S. Cl.
  CPC ............ *B60K 17/16* (2013.01); *B60K 17/22* (2013.01); *B62D 3/02* (2013.01); *B62D 21/12* (2013.01); *B62D 25/08* (2013.01); *B60G 2204/143* (2013.01); *B60G 2300/07* (2013.01); *B60G 2400/82* (2013.01); *B60G 2500/30* (2013.01)

(56) References Cited

U.S. PATENT DOCUMENTS

| | | | |
|---|---|---|---|
| 2010/0230192 A1* | 9/2010 | Riley | B60K 6/52 180/65.28 |
| 2013/0175779 A1* | 7/2013 | Kvien | B62D 21/183 280/124.15 |
| 2016/0257360 A1* | 9/2016 | Mackenzie | B62D 63/025 |
| 2017/0136874 A1* | 5/2017 | Harris | B60K 17/165 |

\* cited by examiner

MODULAR FRONT DRIVETRAIN ASSEMBLY

PRIORITY

This application is a continuation-in-part of, and claims the benefit of, U.S. patent application, entitled "Modular Front Drivetrain Assembly," filed on Sep. 14, 2020, and having application Ser. No. 17/019,829, which claims the benefit of, and priority to, U.S. Provisional Application, filed on Sep. 14, 2019, and having application Ser. No. 62/900,481. This application also claims the benefit of, and priority to, U.S. Provisional Application, entitled "Front Structural Bulkhead For Vehicle Chassis", filed on Mar. 22, 2021, and having application Ser. No. 63/164,079. The entirety of each of the aforementioned applications are incorporated herein by reference.

FIELD

Embodiments of the present disclosure generally relate to the field of vehicle drivetrains. More specifically, embodiments of the disclosure relate to an apparatus and methods for a modular front drivetrain comprising a single assembly that may be installed onto and removed from a vehicle.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side-by-Side variety. The Side-by-Side is a four-wheel drive off-road vehicle that typically seats between two and six occupants and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms," although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power from a transaxle to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

An apparatus and methods are provided for a modular front drivetrain comprising a single assembly that may be installed onto and removed from a vehicle. The modular front drivetrain comprises a modular chassis supporting a transaxle, a front differential, and a steering gear for operating front wheels of the vehicle. The transaxle and front differential are configured to convey torque from an engine onboard the vehicle to the front wheels. A spindle assembly is coupled with each front wheel of the vehicle and pivotally joined with the modular chassis by way of a front suspension system. A drive axle is engaged with the front differential and each spindle assembly for conveying torque to the front wheels. Steering rods coupled with the spindle assemblies are configured for horizontally rotating the front wheels according to operation of a steering wheel onboard the vehicle. The modular front drivetrain is configured to facilitate a practitioner replacing an entire drivetrain and suspension quickly and easily in the event of a part failure.

In an exemplary embodiment, a modular front drivetrain for operating front wheels of a vehicle comprises: a modular chassis supporting a drivetrain and a steering system operatively coupled with the front wheels; a spindle assembly coupled with each front wheel; and a front suspension system coupling each spindle assembly to the modular chassis.

In another exemplary embodiment, the modular front drivetrain comprises a single drivetrain and suspension assembly that is configured to be installed onto and removed from the vehicle. In another exemplary embodiment, the modular front drivetrain is configured to facilitate a practitioner replacing an entire drivetrain and suspension quickly and easily in the event of a part failure.

In another exemplary embodiment, the front suspension system includes an upper control arm and a lower control arm that are configured to couple the front wheel with the modular chassis. In another exemplary embodiment, the upper control arm comprises two inboard upper control arm joints that couple the upper control arm to the modular chassis and an outboard upper control arm joint that couples the upper control arm to the spindle assembly. In another exemplary embodiment, the lower control arm includes two inboard lower control arm joints that couple the lower control arm to the modular chassis and an outboard lower control arm joint that couples the lower control arm to the spindle assembly. In another exemplary embodiment, the upper control arm and the lower control arm are configured to facilitate vertical motion of the front wheel during travel over terrain and accommodate horizontal motion of the front wheel during steering of the front wheel by way of the steering gear. In another exemplary embodiment, a strut that is comprised of a shock absorber and a coil spring is mounted to the lower control arm by way of a lower pivot; and wherein a top of the strut is coupled to an upper pivot disposed on a chassis of the vehicle.

In another exemplary embodiment, the drivetrain includes a transaxle, a front differential and a drive axle coupled between each front wheel and the front differential. In another exemplary embodiment, the drive axle is configured to conduct torque from the transaxle to the front wheel and accommodate vertical pivoting motion of the front suspension system in response to road conditions. In another exemplary embodiment, the drive axle includes a constant velocity joint that is coupled with the spindle assembly and configured to allow uninterrupted torque transmission from the transaxle to the front wheel during vertical pivoting of the front suspension assembly due to road conditions.

In another exemplary embodiment, the steering system includes a steering rod coupled between each spindle assembly and a steering gear disposed on the modular chassis. In another exemplary embodiment, the steering gear is configured to cause the front wheels to articulate horizontally with respect to the modular chassis upon the steering gear being turned by way of a steering wheel of the vehicle. In another exemplary embodiment, the steering rod is coupled with each spindle assembly by way of a steering rod-end joint configured to allow vertical and horizontal rotational motion of the spindle assembly during operation of the vehicle. In another exemplary embodiment, the steering rod-end joint is coupled with each spindle assembly forward of a drive axle so as to provide a leading-edge steering system to the vehicle.

In an exemplary embodiment, a method for a modular front drivetrain for operating front wheels of a vehicle comprises: configuring a modular chassis for supporting a drivetrain to convey torque from an engine onboard the vehicle to the front wheels; coupling each front wheel to the modular chassis by way of a spindle assembly and a front suspension system; communicating torque from the drivetrain to the front wheel by way of a front differential and drive axles; coupling a braking system with the drive axles for slowing rotation of the front wheels; disposing a steering system on the modular chassis for directing horizontal motion of the front wheels; and installing the modular front drivetrain onto the vehicle.

In another exemplary embodiment, the method further comprises configuring the modular front drivetrain as a single drivetrain and suspension assembly to be installed onto and removed from the vehicle. In another exemplary embodiment, coupling includes configuring the front suspension system to allow vertical motion of the front wheels due to road conditions. In another exemplary embodiment, disposing includes coupling a steering rod between each spindle assembly and a steering gear disposed on the modular chassis. In another exemplary embodiment, coupling the steering rod includes coupling a steering rod-end joint with each spindle assembly forward of the drive axles to provide a leading-edge steering system to the vehicle. In another exemplary embodiment, communicating torque includes coupling each drive axle with the spindle assembly by way of a constant velocity joint configured to allow uninterrupted torque transmission from the transaxle to the front wheel during vertical pivoting of the front suspension assembly due to road conditions.

In an exemplary embodiment, a front structural bulkhead for an off-road vehicle comprises: a modular chassis for supporting drivetrain components that are operably coupled with front wheels of the vehicle; upper mounting points for coupling with upper control arms comprising a front suspension; lower mounting points for coupling with lower control arms comprising the front suspension; and a steering gear for steering the front wheels.

In another exemplary embodiment, the drivetrain components include any one or more of a transaxle, a front differential, a steering gear, a braking system, and the like. In another exemplary embodiment, the steering gear is coupled with steering rods such that turning the steering gear by way of a steering wheel of the vehicle causes the front wheels to articulate horizontally. In another exemplary embodiment, the upper mounting points and the lower mounting points are configured to allow the front wheels to move vertically due to the vehicle traveling over terrain.

In another exemplary embodiment, the upper mounting points are configured to receive inboard joints comprising upper control arms. In another exemplary embodiment, the lower mounting points are configured to receive inboard joints comprising lower control arms.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
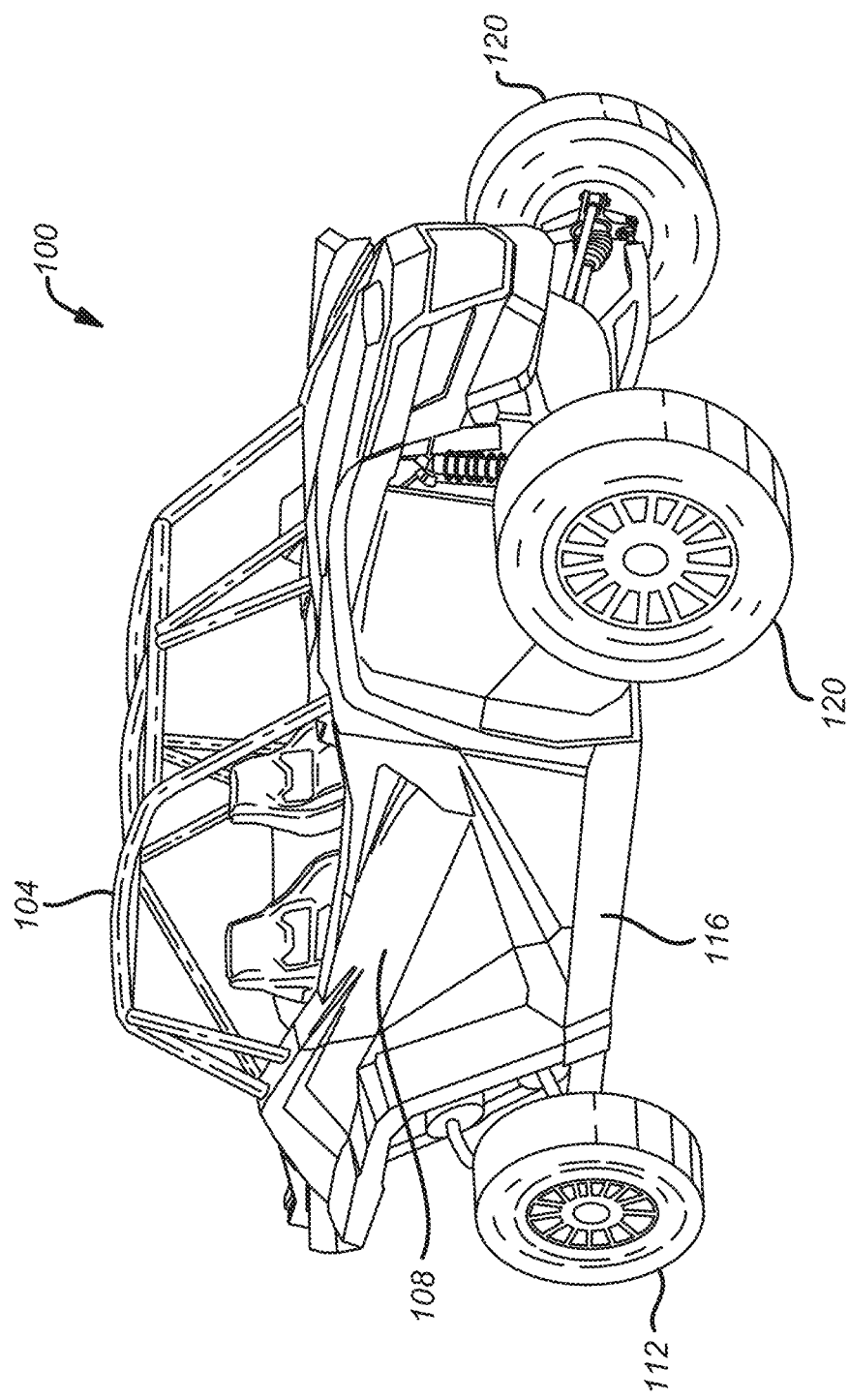
FIG. 1 illustrates an exemplary embodiment of an off-road vehicle that is particularly suitable for implementation of a modular front drivetrain in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the modular front drivetrain and methods disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

A double wishbone suspension generally comprises upper and lower suspension arms that operably couple a front wheel of a vehicle. The upper and lower suspension arms each typically include two mounting points to a chassis of the vehicle and one mounting joint at a spindle assembly. The spindle assembly is coupled between the outboard ends of the upper and lower suspension arms and is configured to allow vertical and horizontal radial movement of a wheel coupled with the spindle assembly. Constant velocity (CV) joints allow pivoting of the suspension arms and the spindle assembly, while a drive shaft coupled to the CV joint conveys power from a transaxle to the wheel. Given that off-road vehicles routinely travel over very rough terrain, such as mountainous regions, there is a desire to improve the mechanical strength and performance of off-road drivetrain and suspension systems, while at the same reducing the mechanical complexity of such systems. Embodiments of the disclosure provide to a modular front drivetrain comprising a single assembly that may be installed onto and removed from a vehicle.

FIG. 1 shows an off-road vehicle 100 that is particularly suitable for implementation of a modular front drivetrain in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of a front suspension system and a spindle assembly. It should be understood, however, that the modular front drivetrain disclosed herein is not to be limited to the off-road vehicle 100, but rather the modular front drivetrain may be incorporated into a wide variety of vehicles, other than UTVs, without limitation.

Figure 2:
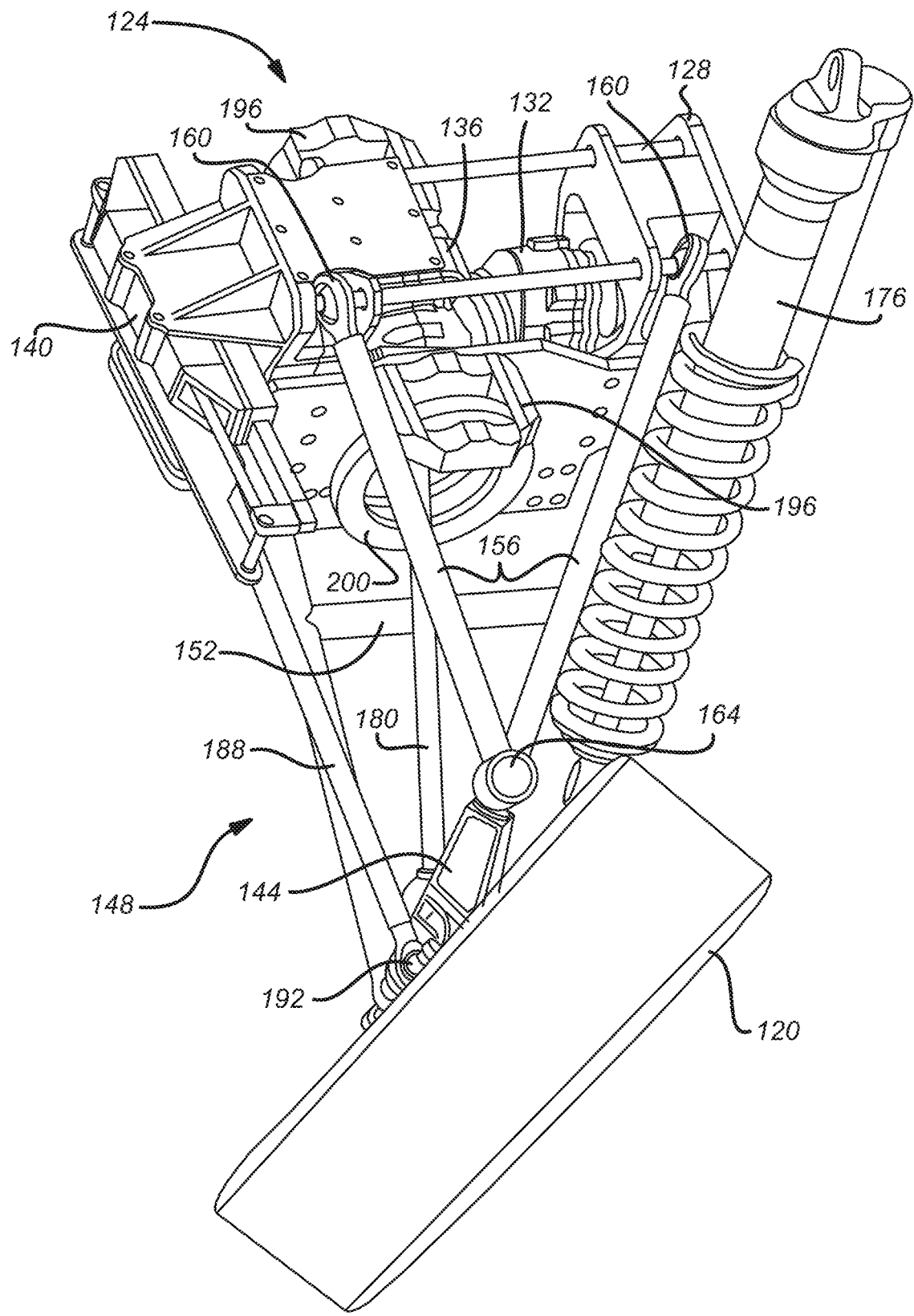
FIG. 2 illustrates an upper perspective view of a driver-side portion of an exemplary embodiment of a modular front drivetrain.

FIG. 2 illustrates an upper perspective view of a driver-side portion of an exemplary embodiment of a modular front drivetrain 124 that may be implemented in the off-road vehicle 100. The modular front drivetrain 124 includes a modular chassis 128 that supports a transaxle 132, a front differential 136, and a steering gear 140 that are operably coupled with a spindle assembly 144 and the front wheel 120 by way of a front suspension system 148. Further, the modular chassis 128 provides mounting points for the front suspension 148, in lieu of conventional mounting points that comprise portions of the chassis 116 of the vehicle. It is to be understood, therefore, that the modular front drivetrain 124 comprises a single drivetrain/suspension assembly that may be installed onto and removed from the vehicle 100, unlike a conventional drivetrain and suspension that comprise multiple components that must be individually assembled onto the chassis 116 of the vehicle.

Figure 3:
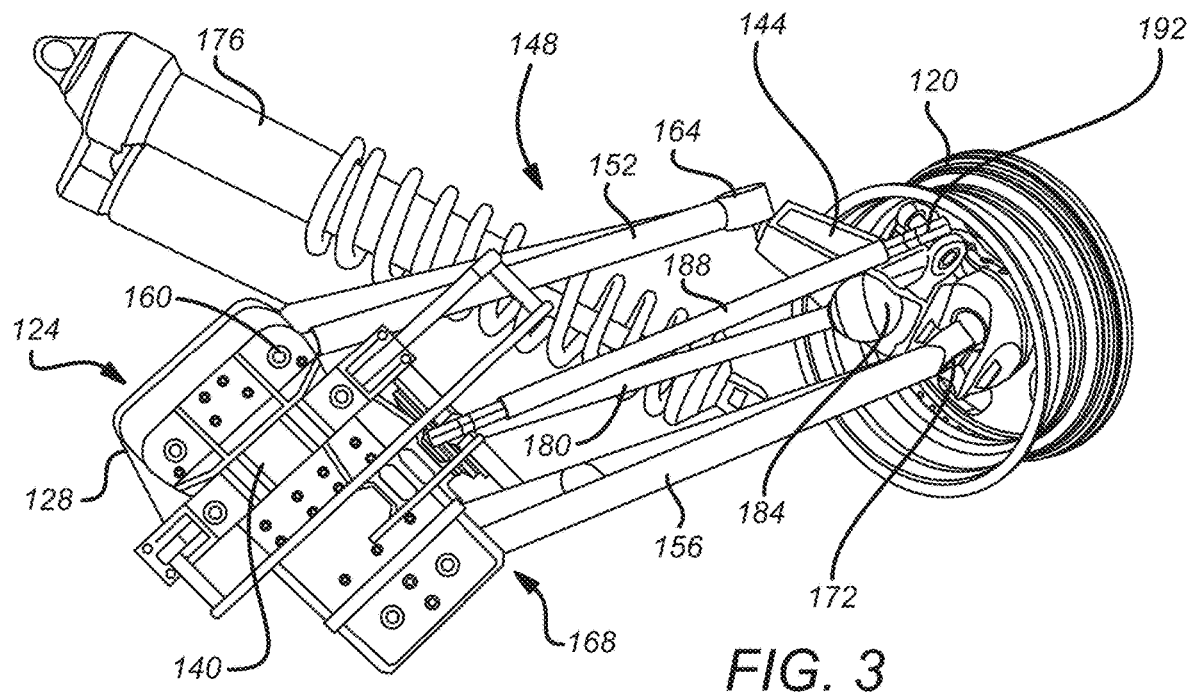
FIG. 3 illustrates a front view of the modular front drivetrain of FIG. 2.

The front suspension system 148 includes an upper control arm (UCA) 152 and a lower control arm (LCA) 156 that couple the front wheel 120 with the modular chassis 128. The UCA 152 comprises two inboard UCA joints 160 that couple the UCA 152 to the modular chassis 128 and an outboard UCA joint 164 that couples the UCA 152 to the spindle assembly 144. As best shown in FIG. 3, the LCA 156 includes two inboard LCA joints 168 that couple the LCA 156 to the modular chassis 128 and an outboard LCA joint 172 that couples the LCA 156 to the spindle assembly 144. As will be recognized, the UCA and LCA 152, 156 generally are of a double wishbone variety of suspension that facilitates vertical motion of the front wheel 120 during travel over terrain, as well as facilitating horizontal motion of the front wheel 120 during steering of the vehicle 100 by way of the steering gear 140. The UCA and LCA 152, 156 further facilitate controlling various parameters affecting the orientation of the front wheel 120 with respect to the off-road vehicle 100, such as, by way of non-limiting example, camber angle, caster angle, toe pattern, roll center height, scrub radius, and scrub.

It should be understood that although the front suspension system 148 is disclosed specifically in connection with the driver-side of the off-road vehicle 100, a passenger-side front suspension system is to be coupled with a passenger side of the modular chassis 128. It should be further understood that the passenger-side front suspension system is substantially identical to the driver-side front suspension system 148, with the exception that the passenger-side front suspension system is configured specifically to operate with the passenger-side of the modular chassis 128. As will be appreciated, therefore, the passenger-side front suspension system and the driver-side front suspension system 148 may be configured as reflections of one another across a longitudinal midline of the off-road vehicle 100.

As shown in FIGS. 2-3, a strut 176 that is comprised of a shock absorber and a coil spring is mounted to the LCA 156 by way of a lower pivot (not shown). A top of the strut 176 is coupled to an upper pivot (not shown) that may be disposed on the chassis 116 of the vehicle 100. The strut 176 is configured to dampen vertical motion of the front suspension system 148 due to movement of the front wheel 120 as the vehicle 100 travels over terrain. The UCA 152 may be suitably configured, such as in the form of a J-arm, so as to facilitate coupling the strut 176 between the LCA 156 and the chassis 116 (see FIG. 1) of the vehicle 100 in lieu of being coupled between the UCA 152 and the chassis 116.

Moreover, it is contemplated that in some embodiments, the strut 176 may be coupled between the LCA 156 and the modular chassis 128, without limitation, and without deviating beyond the scope of the present disclosure.

Figure 4:
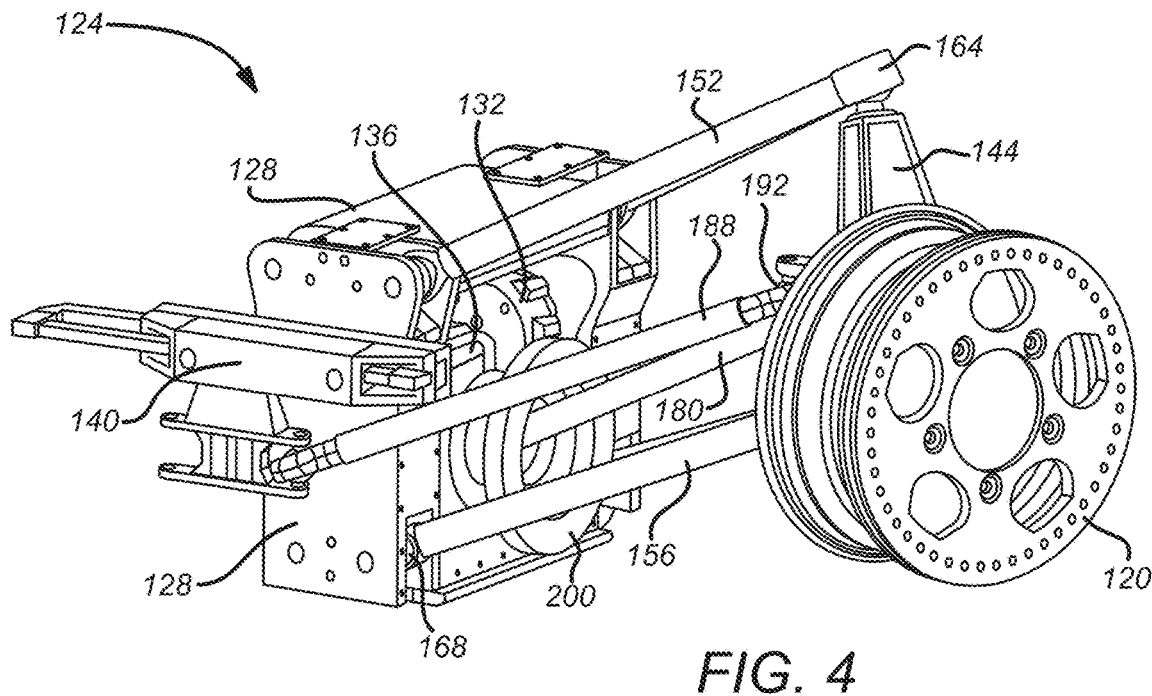
FIG. 4 illustrates an upper perspective view of a driver-side portion of an exemplary embodiment of a modular front drivetrain.

As best shown in FIG. 2, a drive axle 180 is coupled between the front wheel 120 and the front differential and transaxle 136, 132. The drive axle 180 is configured to conduct torque from the transaxle 132 to the front wheel 120 and accommodate vertical pivoting motion of the front suspension system 148 in response to road conditions, as is straightforward to see upon comparing FIG. 3 and FIG. 4. As best shown in FIG. 3, the drive axle 180 includes a constant velocity (CV) joint 184 that is coupled with the spindle assembly 144. The CV joint 184 enables uninterrupted torque transmission from the transaxle 132 to the front wheel 120 during vertical pivoting of the front suspension assembly 148 due to road conditions.

In the embodiment illustrated in FIGS. 2-3, a steering rod 188 couples the spindle assembly 144 with the steering gear 140 disposed on the modular chassis 128. The steering rod 188 may be coupled with the spindle assembly 144 by way of a steering rod-end joint 192 that is similar to the inboard UCA joints 160. It is contemplated, therefore, that the steering rod-end joint 192 may be of a Heim-joint variety or may be of a bushing variety, as desired. As will be appreciated, the steering rod-end joint 192 allows vertical and horizontal rotational motion of the spindle assembly 144 during operation of the vehicle 100.

Moreover, the steering rod-end joint 192 is coupled with the spindle assembly 144 forward of the drive axle 180, thereby providing a leading-edge steering system to the vehicle 100. Experimentation has demonstrated that the leading-edge steering system shown in FIGS. 2-3 advantageously decreases leverage of the front wheel 120 on the steering rod-end joint 192 and the steering rod 188, thereby substantially eliminating bump steer that may occur due to forces exerted on the front wheel 120 by rough terrain. Details pertaining to rod-end joints are disclosed in above-mentioned U.S. patent application Ser. No. 15/625,692, which is entitled "Rod-End Front Suspension." Further, details pertaining to leading-edge steering systems are disclosed in U.S. patent application Ser. No. 15/625,813, entitled "Leading-Edge Steering Assembly," filed on Jun. 16, 2017, the entirety of which is incorporated herein by reference.

Turning again to FIG. 2, the modular front drivetrain 124 may further include a braking system configured to enable a practitioner to slow the rotation rate of the front wheel 120 during operation of the vehicle 100. In the illustrated embodiment of FIGS. 2-3, the brake system comprises a brake caliper 196 that is fastened onto the modular chassis 128. A brake disc 200 is coupled to the drive axle 180 such that a periphery of the brake disc 200 passes within the brake caliper 196. As will be recognized, when the practitioner depresses a brake pedal of the vehicle 100 the brake caliper 196 applies pressure to the brake disc 200, thus slowing the rotation rate of the front wheel 120. The brake caliper 196 may be cable operated or may be operated by way hydraulic lines. Although not shown in FIGS. 2-3, the brake disc 200 may be coupled with a hub comprising the front differential 136. In some embodiments, however, the brake disc 200 may be coupled with a constant velocity joint that is coupled with the hub of the front differential 136. It is contemplated that the brake caliper 196 and the brake disc 200 may be incorporated into the modular front drivetrain 124 in a wide variety of configurations, without limitation, and without deviating beyond the scope of the present disclosure.

As disclosed hereinabove, the modular front drivetrain 124 comprises a modular chassis 128 that supports the transaxle 132, the front differential 136, the drive axle 180 and the front suspension system 148, such that engine torque applied to the transaxle 132 is conveyed to the front wheel 120. The modular chassis 128 also supports the steering gear 140 and the steering rod 188, such that turning the steering gear 140, by way of a steering wheel of the vehicle 100, causes the front wheel 120 to articulate horizontally with respect to the modular chassis 128. Further, the modular chassis 128 provides mounting points for the front suspension 148 that allow the front wheel 120 to move vertically from a low position (e.g., due to "maximal bounce"), shown in FIG. 3, to a high position (e.g., due to "maximal bump"), shown in FIG. 4. As such, the modular front drivetrain 124 is not limited to the specific configuration shown in FIGS. 2-3, but rather the configuration of the modular front drivetrain 124 may be varied in accordance with the configuration of each of the components comprising the modular front drivetrain 124, without limitation.

Moreover, the modular front drivetrain 124 generally may be varied in accordance with the specific type of vehicle 100 into which the modular front drivetrain 124 is to be implemented. It is contemplated that the modular front drivetrain 124 may be implemented in any of various off-road vehicles 100, such as, by way of non-limiting example, Utility Task Vehicles (UTVs), Recreational Off-Highway Vehicles (ROVs), or Multipurpose Off-Highway Utility Vehicles (MOHUVs), without limitation. As such, the modular front drivetrain 124 is particularly well-suited for off-road racing applications, such as desert racing, short course racing, hill climbing, rallying, and the like.

In addition to the off-road applications discussed above, it is contemplated that, in some embodiments, the modular front drivetrain 124 may be incorporated into racing vehicles that are not necessarily intended for off-road racing. For example, the modular front drivetrain 124 may be incorporated into racing vehicles that may be used for any of formula racing, sports car racing, stock car racing, drag racing, touring car racing, production car racing, as well as amateur open-wheel racing applications, such as karting, and the like. In such applications, the modular front drivetrain 124 advantageously enables an entire drivetrain and suspension assembly to be quickly and easily replaced in the event of a part failure, unlike in the case of conventional racing vehicles that may be sidelined during a race due to the failure of an individual part comprising the drivetrain or the suspension.

In some embodiments, the strength and performance of an off-road vehicle chassis may be improved by implementing a front structural bulkhead. For example, in some embodiments, the chassis may be a welded-tube variety of chassis that includes a front portion and a rear portion that are joined to an intervening passenger cabin portion, wherein frontward stays and a bulkhead mount couple the front structural bulkhead to the front portion. Bulkhead mount pillars and a bulkhead mount crossmember may be used to couple the front structural bulkhead to the passenger cabin portion. In some embodiments, the front structural bulkhead includes a modular chassis for supporting drivetrain components that are operably coupled with front wheels of the vehicle. The front structural bulkhead may further include upper and lower mounting points configured to receive front suspension controls arms that allow the front wheels to move vertically due to the vehicle traveling over terrain.

Figure 5:
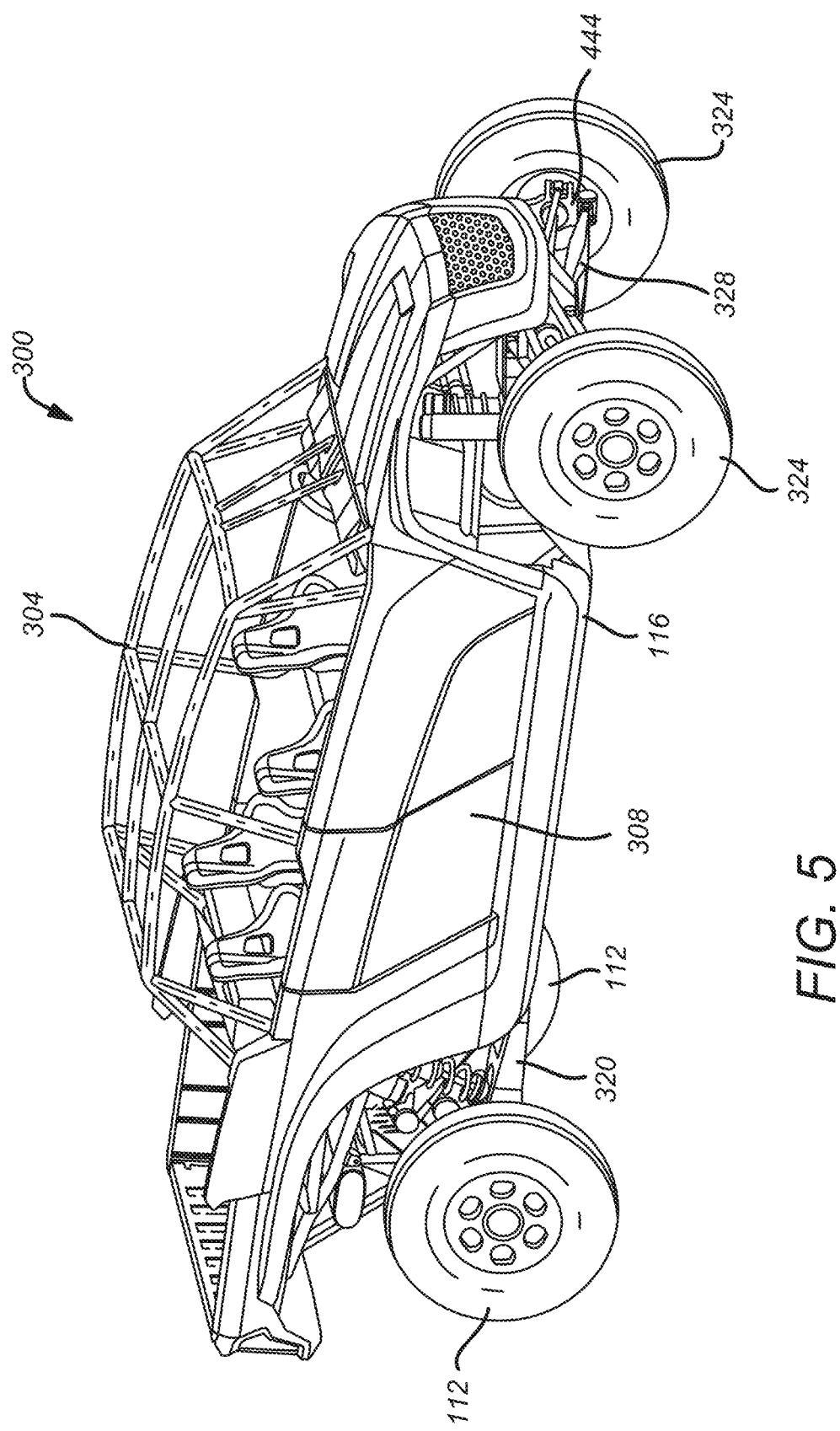
FIG. 5 illustrates an exemplary embodiment of an off-road vehicle that is configured to seat up to four occupants and includes a front structural bulkhead in accordance with the present disclosure.

FIG. 5 shows an exemplary embodiment of an off-road vehicle 300 that is particularly suitable for implementation of a front structural bulkhead in accordance with the present disclosure. The off-road vehicle 300 shown in FIG. 5 generally is of a Utility Task Vehicle (UTV) variety that seats up to four occupants, includes a roll-over protection system 304, and may have a cab enclosure 308. Rear wheels 112 of the off-road vehicle 300 may be operably coupled with a chassis 116 by way of a trailing arm suspension system 320. Front wheels 324 may be operably coupled with the chassis 116 by way of a front suspension system 328. It should be understood, however, that the front structural bulkhead disclosed herein is not to be limited to the specific off-road vehicle 300 shown in FIG. 5, but rather the front structural bulkhead may be incorporated into a wide variety of vehicles, other than the off-road vehicle 300 of FIG. 5, without limitation.

Figure 6:
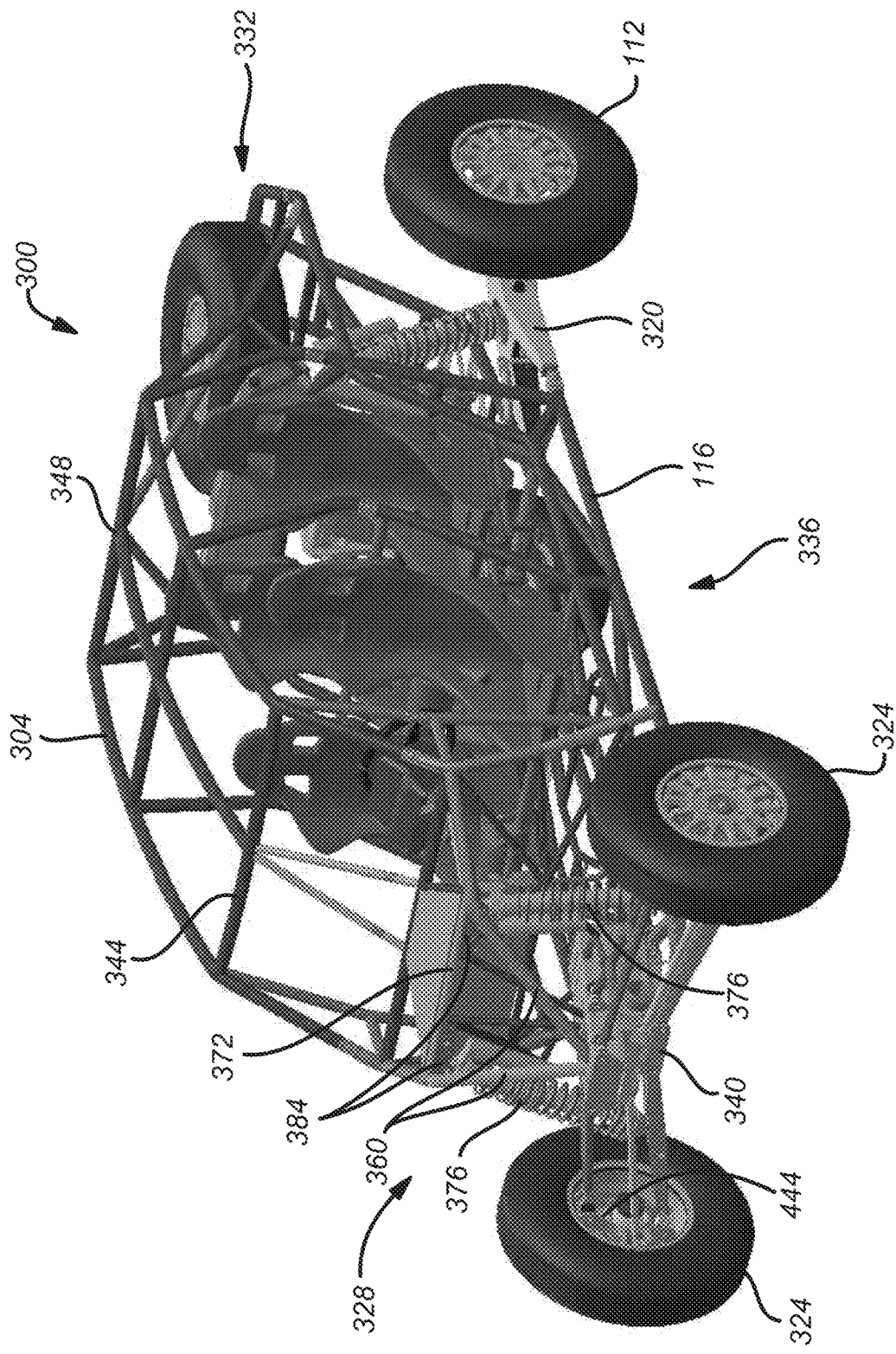
FIG. 6 illustrates an exemplary embodiment of an off-road vehicle that includes a front structural bulkhead in accordance with the present disclosure.

FIG. 6 illustrates an exemplary embodiment of an off-road vehicle 300 that includes a front structural bulkhead 340 in accordance with the present disclosure. In the embodiment illustrated in FIG. 6, the cab enclosure 308 and other body panels are removed to reveal the chassis 116 and the front structural bulkhead 340 comprising the off-road vehicle 300. The chassis 116 generally is a welded-tube variety of chassis that includes a front portion 328 and a rear portion 332 that are joined to an intervening passenger cabin portion 336. The passenger cabin portion 336 shown in FIG. 6 is configured to seat up to four occupants. A front canopy 344 and a rear canopy 348 are configured to impart structural integrity to the chassis 116 and to provide a roll-over protection system 304 to occupants of the off-road vehicle 300.

The front portion 328 generally is configured to support various components comprising the off-road vehicle 300, such as, by way of non-limiting example, the front suspension 328 and the front structural bulkhead 340. The rear portion 332 is configured to support the rear suspension 320 of the off-road vehicle 300, such as rear trailing arms, as well as support various drivetrain components, shown in FIG. 5, such as an engine, a transaxle, a rear differential, an engine, and the like.

As will be appreciated, the passenger cabin portion 336, as well as the front and rear portions 328, 332, are configured to distribute loading forces arising during operation of the vehicle 300 so as to resist damage to components comprising the vehicle 300 and to protect occupants riding within the vehicle 300. To this end, the front canopy 344 and the rear canopy 348 that are configured to be coupled with the chassis 116. More specifically, the front canopy 344 is configured to be coupled with the front portion 328, and the rear canopy 348 is configured to be coupled with the rear portion 332. Further, the front canopy 344 is configured to be coupled with the rear canopy 348. It should be recognized, therefore, that the front canopy 344 and the rear canopy 348 are configured to contribute to the overall integrity of the entire chassis 116.

Figure 7:
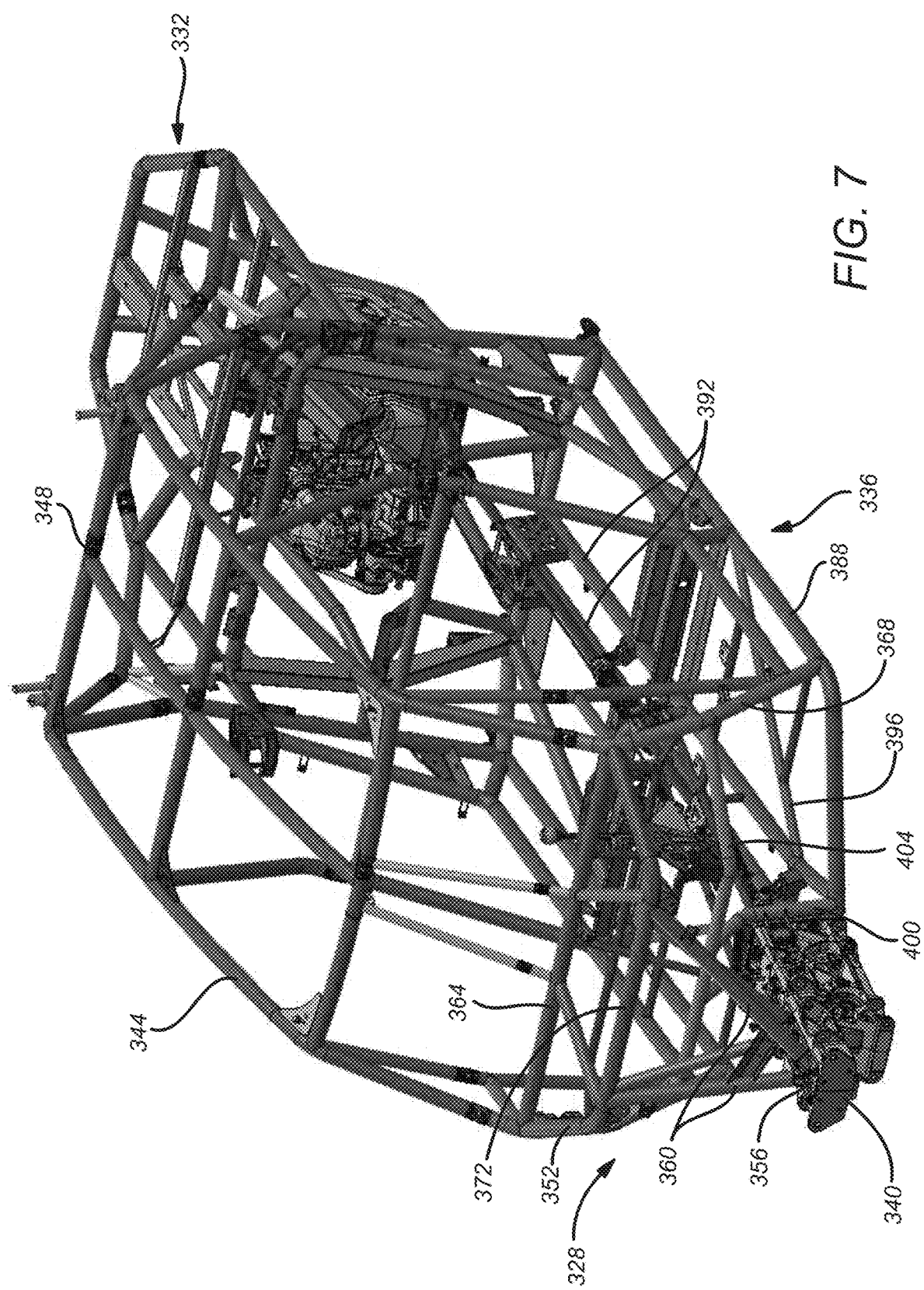
FIG. 7 illustrates an isometric view of an exemplary embodiment of vehicle chassis that includes a front structural bulkhead according to the present disclosure.

As mentioned above, the front portion 328 generally supports various components comprising the off-road vehicle 300, including the front suspension 328 and the front structural bulkhead 340. As shown in FIG. 7, the front portion 328 may be defined by a front hoop 352 at a top of the front portion 328 and a bulkhead mount 356 at a bottom of the front portion 328. Frontward stays 360 attach the front hoop 352 to the bulkhead mount 356. The bulkhead mount 356 is configured to be coupled with the front structural bulkhead 340 (see FIG. 6), which supports at least the front suspension 328 and includes a steering gear, a front differential, and the like. In some embodiments, the bulkhead mount 356 may be coupled with a modular front drivetrain that supports an entire front drivetrain and suspension assembly. In such applications, the modular front drivetrain advantageously enables the entire drivetrain and suspension assembly to be quickly and easily replaced in the event of a part failure, unlike in the case of conventional off-road vehicles that may be sidelined during a race due to the failure of an individual part comprising the drivetrain or the suspension. The frontward stays 360 operate to couple the modular front drivetrain to the chassis 116. Opposite of the frontward stays 360, the front hoop 352 is joined to opposite ends of a dash bar 364 and hinge pillars 368 comprising the passenger cabin portion 336.

Figure 8:
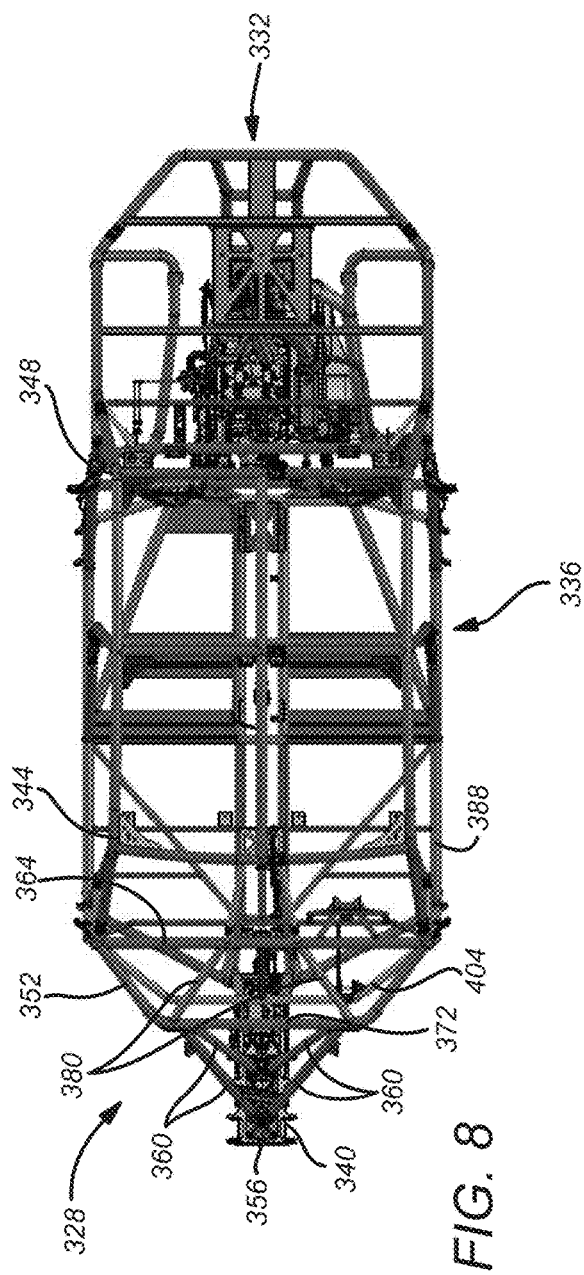
FIG. 8 illustrates a top plan view of the vehicle chassis of FIG. 7, in accordance with the present disclosure.
Figure 10:
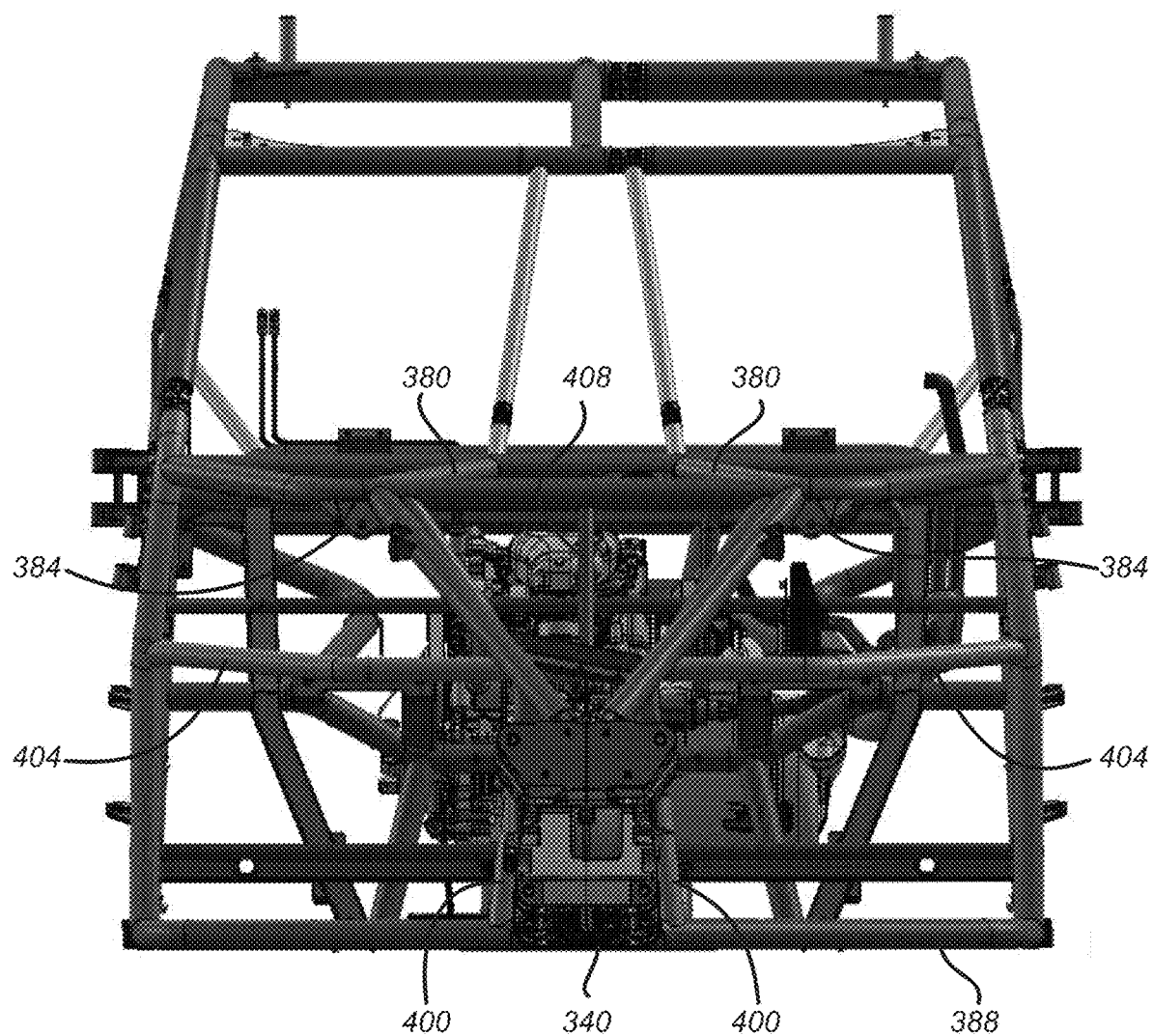
FIG. 10 illustrates a front view of the vehicle chassis of FIG. 8, showing a front structural bulkhead coupled with the vehicle chassis, in accordance with the present disclosure.

With continuing reference to FIG. 7, a front strut crossmember 372 comprises a portion of the front hoop 352 between the driver-side and passenger-side of the front hoop 352. The front strut crossmember 372 provides a means for coupling front struts 376 to the chassis 328, as shown in FIG. 6. As best shown in FIG. 8, front strut braces 380 are disposed between the front strut crossmember 372 and the dash bar 364. The front strut braces 380 are configured to reinforce the front strut crossmember 372, such that loading on the front strut crossmember 372 by the front struts 376 and the bulkhead 340 is distributed to the dash bar 364. As shown in FIG. 10, one end of each front strut brace 380 is coupled to a location of a front strut crossmember 372 that is above a top mount 384 of each front strut 376 (see FIG. 6). Further, each front strut brace 380 is coupled to the front strut crossmember 372 near the joining of the forward stays 360 and the front strut crossmember 372. As such, forces on the front strut crossmember 372 by the front struts 376 and the bulkhead 340, during operation of the vehicle 300, are shared by the dash bar 364.

Figure 9:
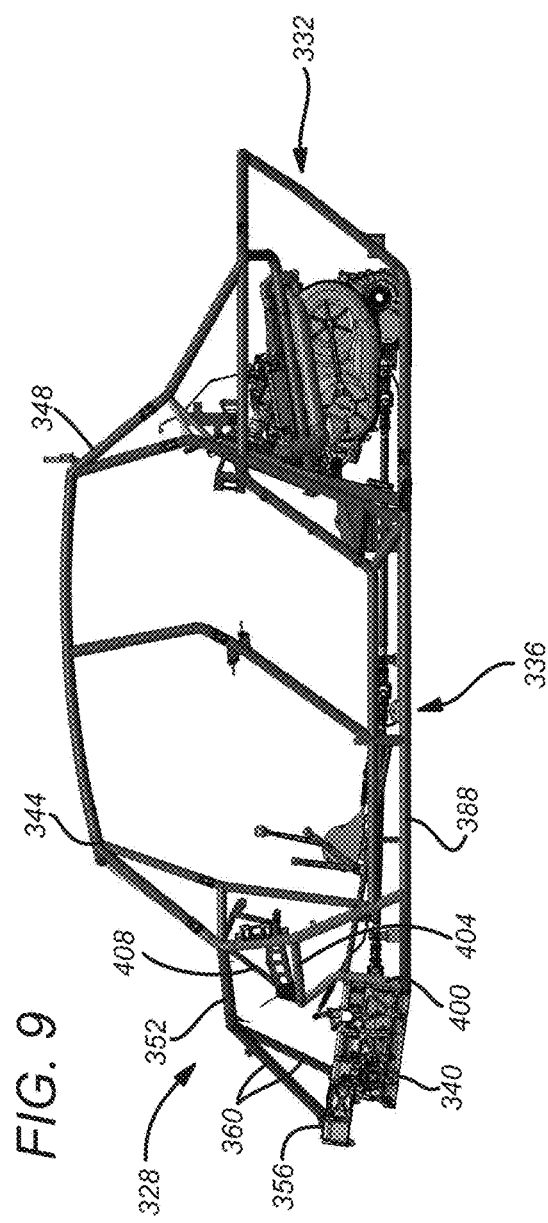
FIG. 9 illustrates a side plan view of the vehicle chassis of FIG. 8 according to the present disclosure.

With continuing reference to FIG. 7, the floor hoop 388 generally defines a floor of the passenger cabin portion 336. Longitudinal floor bars 392 and crossmembers 396 coupled with the floor hoop 388 impart structural strength to the passenger cabin portion 336 and facilitate coupling various components to the floor of the passenger cabin portion 336. At a front-most position of the floor hoop 388 bulkhead mount pillars 400 extend vertically to a bulkhead mount crossmember 404 disposed between the hinge pillars 368. As best shown in FIGS. 8-9, the bulkhead mount pillars 400 and the bulkhead mount crossmember 404 serve to support a rear portion of the bulkhead 340. Further, a brace 408 extends from a midpoint of the bulkhead mount crossmember 404 to the dash bar 364. As such, loading on the bulkhead mount crossmember 404, during operation of the vehicle 300, is distributed throughout the chassis 116.

Figure 11:
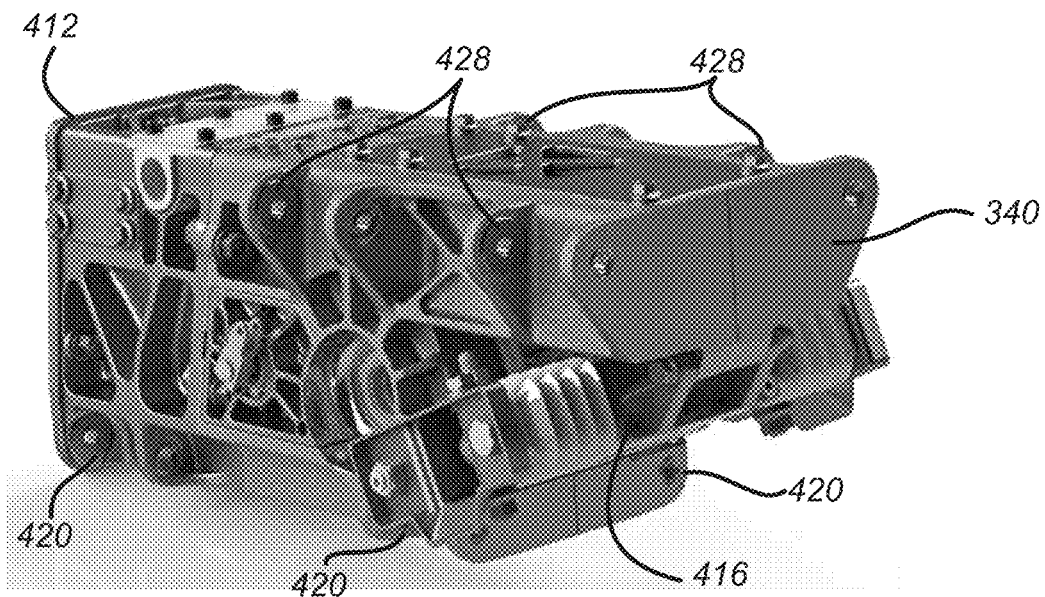
FIG. 11 illustrates a perspective view of an exemplary embodiment of a front structural bulkhead that may be incorporated into an off-road vehicle in accordance with the present disclosure.

FIG. 11 illustrates a perspective view of an exemplary embodiment of a front structural bulkhead 340 that may be incorporated into an off-road vehicle 300 in accordance with the present disclosure. The front structural bulkhead 340 includes a modular chassis 412 that may support any one or more of a transaxle, a front differential, a steering gear 416, a braking system, and the like, that are operably coupled with the front wheels 324 by way of the front suspension system 328, as shown in FIGS. 5-6. Further, the modular chassis 412 provides mounting points for the front suspension 328, in lieu of conventional mounting points that comprise portions of the chassis 116 of the vehicle 300. In particular, the modular chassis 412 includes lower mounting points 420 for coupling with lower control arms 424 (see FIG. 12) comprising the front suspension 328. Further, the modular chassis 412 includes upper mounting points 428 for coupling with upper control arms 432 comprising the front suspension 328. It is to be understood, therefore, that the front structural bulkhead 340 comprises a single drivetrain/suspension assembly that may be installed onto and removed from the vehicle 300, unlike a conventional drivetrain and suspension that comprise multiple components that must be individually assembled onto the chassis 116 of the vehicle 300. Further, the front structural bulkhead 340 integrates the transaxle, the front differential, the steering gear 416, and the front suspension system into the chassis 116.

It is contemplated that the modular chassis 412 may include a braking system configured to enable a practitioner to slow the rotation rate of the front wheel 324 during operation of the vehicle 300. For example, in some embodiments, brake calipers may be fastened onto the modular chassis 412 such that brake discs coupled to drive axles of the vehicle 300 pass within the brake caliper. Thus, when the practitioner depresses a brake pedal of the vehicle 300 the brake calipers apply pressure to the brake discs, slowing the rotation rate of the front wheels 324. The brake calipers may be cable operated or may be operated by way hydraulic lines. Although not shown herein, the brake discs may be coupled with a hub comprising the front differential. In some embodiments, however, the brake discs may be coupled with constant velocity joints that are coupled with the hub of the front differential. It is contemplated that the brake calipers and the brake discs may be incorporated into the front structural bulkhead 340 in a wide variety of configurations, without limitation, and without deviating beyond the scope of the present disclosure.

As disclosed hereinabove, the front structural bulkhead 340 also supports the steering gear 416 and steering rods 436 (see FIG. 12), such that turning the steering gear 416, by way of a steering wheel of the vehicle 300, causes the front wheels 324 to articulate horizontally with respect to the front structural bulkhead 340. Further, the upper and lower mounting points 428, 420 comprising the modular chassis 412 are configured to allow the front wheels 324 to move vertically from a low position (e.g., due to "maximal bounce") to a high position (e.g., due to "maximal bump"). As such, the front structural bulkhead 340 is not limited to the specific configuration shown in FIG. 11, but rather the configuration of the front structural bulkhead 340 may be varied in accordance with the configuration of each of the components comprising the front suspension system 328, without limitation.

Moreover, the front structural bulkhead 340 generally may be varied in accordance with the specific type of vehicle 300 into which the front structural bulkhead 340 is to be implemented. It is contemplated that the front structural bulkhead 340 may be implemented in any of various off-road vehicles 300, such as, by way of non-limiting example, Utility Task Vehicles (UTVs), Recreational Off-Highway Vehicles (ROVs), or Multipurpose Off-Highway Utility Vehicles (MOHUVs), without limitation. As such, the front structural bulkhead 340 is particularly well-suited for off-road racing applications, such as desert racing, short course racing, hill climbing, rallying, and the like.

Figure 12:
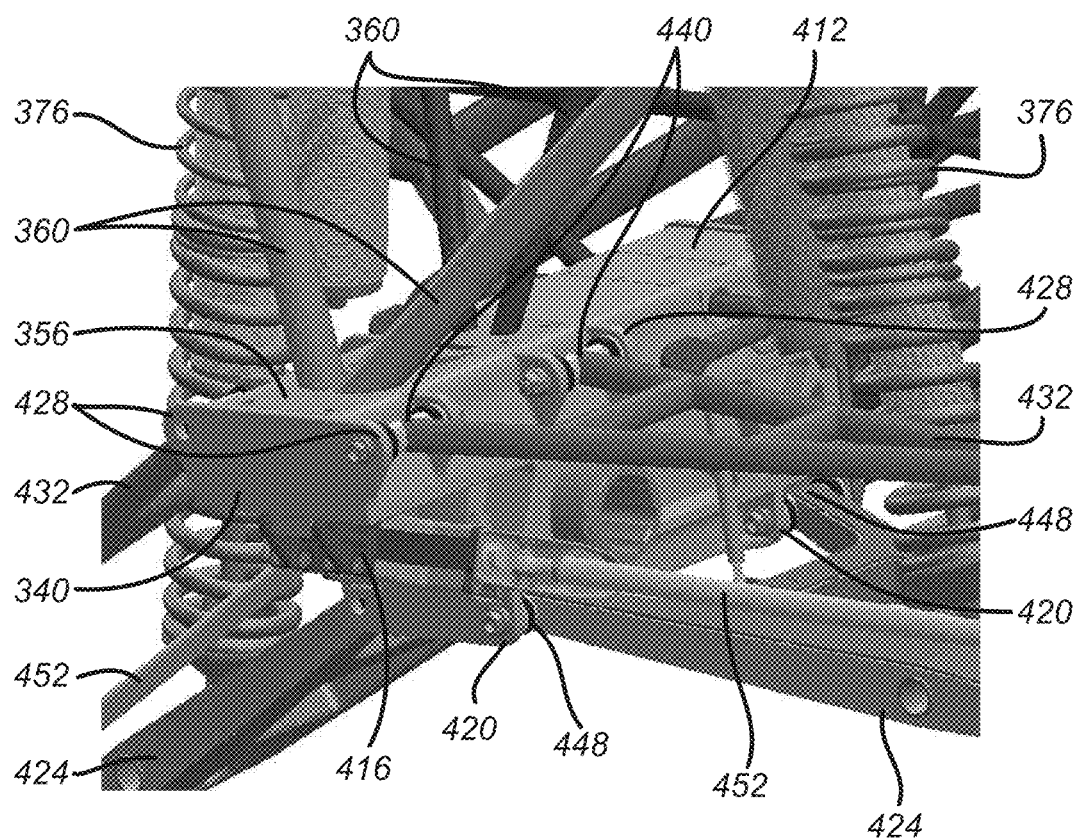
FIG. 12 illustrates a close-up view of an exemplary embodiment of a front structural bulkhead incorporated into an off-road vehicle, according to the present disclosure.

FIG. 12 illustrates a close-up view of an exemplary embodiment of the front structural bulkhead 340 incorporated into the off-road vehicle 300, according to the present disclosure. As shown in FIG. 12, an upper control arm (UCA) 432 and a lower control arm (LCA) 424 comprising the front suspension system 328 couple the front wheels 324 (see FIGS. 5-6) with the front structural bulkhead 340. The UCA 432 comprises two inboard UCA joints 440 that couple the UCA 432 to upper mounting points 428 of the front structural bulkhead 340 and an outboard UCA joint (not shown) that couples the UCA 432 to a spindle assembly 444 (see FIGS. 5-6). The LCA 424 includes two inboard LCA joints 448 that couple the LCA 424 to the front structural bulkhead 340 and an outboard LCA joint (not shown) that couples the LCA 424 to the spindle assembly 444.

As will be recognized, the UCA and LCA 432, 424 generally are of a double wishbone variety of suspension that facilitates vertical motion of the front wheels 324 during travel over terrain, as well as facilitating horizontal turning of the front wheels 324 during steering of the vehicle 300 by way of the steering gear 416 (see FIG. 11). The UCA and LCA 432, 424 further facilitate controlling various parameters affecting the orientation of the front wheels 324 with respect to the off-road vehicle 300, such as, by way of non-limiting example, camber angle, caster angle, toe pattern, roll center height, scrub radius, and scrub. Further, a steering rod 452 coupling each front wheel 324 (see FIGS. 5-6) with the steering gear 416 mounted on the front structural bulkhead 340 allows for vertical movement and horizontal turning of the front wheels 324 during operation of the vehicle 300.

In addition to the off-road applications discussed above, it is contemplated that, in some embodiments, the front structural bulkhead 340 may be incorporated into racing vehicles that are not necessarily intended for off-road racing. For example, the front structural bulkhead 340 may be incorporated into racing vehicles that may be used for any of formula racing, sports car racing, stock car racing, drag racing, touring car racing, production car racing, as well as amateur open-wheel racing applications, such as karting, and the like, without limitation.

While the modular front drivetrain and methods have been described in terms of particular variations and illustrative figures, those of ordinary skill in the art will recognize that the modular front drivetrain is not limited to the variations or figures described. In addition, where methods and steps described above indicate certain events occurring in certain order, those of ordinary skill in the art will recognize that the ordering of certain steps may be modified and that such modifications are in accordance with the variations of the modular front drivetrain. Additionally, certain of the steps may be performed concurrently in a parallel process, when possible, as well as performed sequentially as described above. To the extent there are variations of the modular front drivetrain, which are within the spirit of the disclosure or equivalent to the modular front drivetrain found in the claims, it is the intent that this patent will cover those variations as well. Therefore, the present disclosure is to be understood as not limited by the specific embodiments described herein, but only by scope of the appended claims.

What is claimed is:

1. A modular front drivetrain for an off-road vehicle, the modular front drivetrain configured to be coupled and removed as one piece from a chassis of the off-road vehicle, the modular front drivetrain comprising:
  a modular chassis configured to be removably fastened onto a front portion of the chassis of the vehicle, the modular chassis has a proximal end and a distal end, a left face and a right face, an upper right portion, a lower right portion, an upper left portion, and a lower left portion;
  a steering gear coupled to the proximal end of the modular chassis and a steering rod coupled to the steering gear, the steering rod configured to be coupled to a spindle;
  a front suspension system, the front suspension comprises a right upper control arm that extends from the upper right portion of the modular chassis and a right lower control arm that extends from the lower right portion of the modular chassis;

a front differential mounted within the modular chassis; and a drive axle operably coupled to the front differential and supported by the modular chassis, wherein the modular front drivetrain does not include an engine of the off-road vehicle, wherein the engine is not coupled to the modular chassis, wherein a strut is coupled to the right lower control arm and the chassis of the off-road vehicle.

2. The modular front drivetrain of claim 1, wherein the modular chassis, the front suspension system, the steering gear, the front differential, and the drive axle are configured to be installed and removed from the vehicle as a combined unit.

3. The modular front drivetrain of claim 1, wherein the modular front drivetrain is configured to enable a practitioner to quickly and easily replace an entire drivetrain/suspension assembly in the event of a part failure.

4. The modular front drivetrain of claim 1, wherein the right upper control arm and the right lower control arm are configured to couple to a right front wheel of the vehicle.

5. The modular front drivetrain of claim 1, wherein the modular chassis comprises two upper mounting points at the upper right portion for mounting the right upper control arm to the modular chassis.

6. The modular front drivetrain of claim 5, wherein the modular chassis comprises two lower mounting points for mounting the right lower control arm to the modular chassis.

7. The modular front drivetrain of claim 1, wherein the modular front drivetrain comprises a braking system, the braking system comprises a brake caliper fastened onto the modular chassis and a brake disc coupled with a pair of front wheels.

8. The modular front drivetrain of claim 1, wherein the modular front drivetrain comprises a transaxle mounted to the modular chassis.

9. The modular front drivetrain of claim 1, wherein the distal end of the modular chassis is adapted to be supported by bulkhead mount pillars and a bulkhead mount crossmember of the chassis of the off-road vehicle.

10. The modular front drivetrain of claim 9, wherein a top portion of the modular chassis is adapted to be supported by a brace that extends from a midpoint of the bulkhead mount crossmember to a dash bar of the chassis.

11. The modular front drivetrain of claim 10, wherein the modular chassis is configured to distribute loading throughout the chassis of the vehicle by way of at least the brace, the bulkhead mount pillars, and the bulkhead mount crossmember.

12. A front structural bulkhead for an off-road vehicle, comprising:
a modular chassis, the modular chassis has a proximal end and a distal end, a left face and a right face, upper portions, and lower portions;
upper mounting points disposed at the upper portions on the modular chassis for coupling with upper control arms of a front suspension;
lower mounting points disposed at the lower portions of the modular chassis for coupling lower control arms of the front suspension;
a top portion of the modular chassis configured to be removably fastened to a chassis of the vehicle; and
a rear portion of the modular chassis configured to be removably fastened to the chassis of the vehicle,
wherein an engine of the off-road vehicle is not coupled to the modular chassis.

13. The structural bulkhead of claim 12, wherein the modular chassis includes mounting points configured for fastening brake calipers of a braking system.

14. The structural bulkhead of claim 12, wherein a front portion of the modular chassis comprises a steering gear for steering the front wheels, the steering gear configured to couple a steering rod.

15. The structural bulkhead of claim 12, wherein the front structural bulkhead comprises a consolidated drivetrain/suspension assembly that is configured to be installed and removed from the vehicle as a combined unit.

16. The structural bulkhead of claim 12, wherein the front structural bulkhead is configured to enable a practitioner to quickly and easily replace an entire drivetrain/suspension assembly in the event of a part failure.

17. The structural bulkhead of claim 12, wherein the drivetrain includes a transaxle, a front differential, and drive axles coupled between the front differential and a pair of front wheels.

18. The structural bulkhead of claim 12, wherein the rear portion is adapted to be supported by bulkhead mount pillars and a bulkhead mount crossmember of the chassis of the vehicle.

19. The structural bulkhead of claim 18, wherein the top portion is adapted to be supported by a brace that extends from a midpoint of the bulkhead mount crossmember to a dash bar.

20. The structural bulkhead of claim 19, wherein the modular chassis is configured to distribute loading throughout the chassis by way of at least the brace, the bulkhead mount pillars, and the bulkhead mount crossmember.

* * * * *